(12) United States Patent
Voss et al.

(10) Patent No.: US 6,672,957 B2
(45) Date of Patent: Jan. 6, 2004

(54) COMBINE HARVESTER CLEANING APPARATUS

(75) Inventors: Douglas A. Voss, Wichita, KS (US); Richard C. Eckrote, Inman, KS (US); Robert Honas, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 10/112,444

(22) Filed: Mar. 28, 2002

(65) Prior Publication Data

US 2003/0186731 A1 Oct. 2, 2003

(51) Int. Cl.$^7$ ................................................ A01F 12/32
(52) U.S. Cl. ....................................................... 460/101
(58) Field of Search ................................. 460/101, 145, 460/102, 104, 97, 85, 90, 91, 92, 94, 902; 56/16.5

(56) References Cited

U.S. PATENT DOCUMENTS

| | | | | |
|---|---|---|---|---|
| 1,547,476 A | * | 7/1925 | White | 460/85 |
| 1,771,240 A | | 7/1930 | Worthington | |
| 1,884,114 A | * | 10/1932 | Moroney | 460/99 |
| 2,212,092 A | | 8/1940 | Wood | |
| 2,351,567 A | | 6/1944 | Welty | |
| 2,395,163 A | * | 2/1946 | Carroll | 209/318 |
| 2,670,845 A | * | 3/1954 | Busack et al. | 209/26 |
| 3,472,235 A | * | 10/1969 | van der Lely | 460/13 |
| 3,593,719 A | * | 7/1971 | Ashton et al. | 460/73 |
| 3,757,797 A | * | 9/1973 | Mathews | 460/91 |
| 4,344,443 A | | 8/1982 | De Busscher et al. | |
| 4,392,500 A | * | 7/1983 | Houle | 460/85 |
| 4,535,788 A | | 8/1985 | Rowland-Hill et al. | |
| 4,736,753 A | | 4/1988 | Glaubitz et al. | |
| 4,863,415 A | | 9/1989 | Carnewal et al. | |
| 5,497,605 A | | 3/1996 | Underwood et al. | |
| 5,791,986 A | | 8/1998 | Underwood et al. | |
| 6,056,639 A | | 5/2000 | Gryspeerdt et al. | |
| 6,190,253 B1 | * | 2/2001 | Preece | 460/85 |
| 6,238,285 B1 | | 5/2001 | Gryspeerdt et al. | |

* cited by examiner

*Primary Examiner*—Árpád Fab Kovács
(74) *Attorney, Agent, or Firm*—Hovey Williams LLP

(57) ABSTRACT

The cleaning apparatus of a combine harvester has an oscillating sieve assembly and an oscillating pan assembly beneath the sieve assembly. The sieve assembly comprises a pair of superimposed sieves, both of which are mounted on the same frame for oscillation in unison and always in the same direction. The pan assembly comprises a clean grain pan and a tailings return pan both mounted on a common frame that is separate from the frame of the sieve assembly so that the pans oscillate separately from the sieves. The sieve and pan assemblies are mounted and driven in such a manner that the feed stroke of each assembly is in the same direction as its direction of conveyance, so as to maximize their ability to deliver materials in the intended direction. The clean grain pan, and optionally also the tailings return pan, is corrugated along its upper feeding surface with the corrugations inclined forwardly in the conveying direction so as to maximize the feeding action while minimizing retrograde movement of the materials thereon.

9 Claims, 5 Drawing Sheets

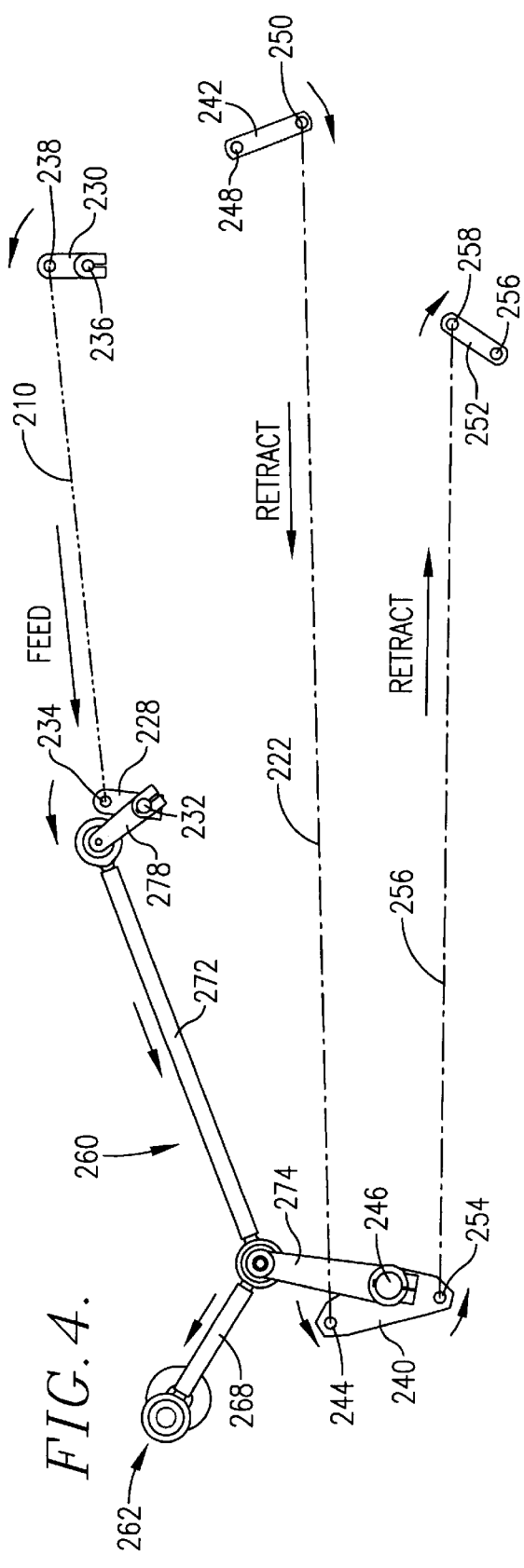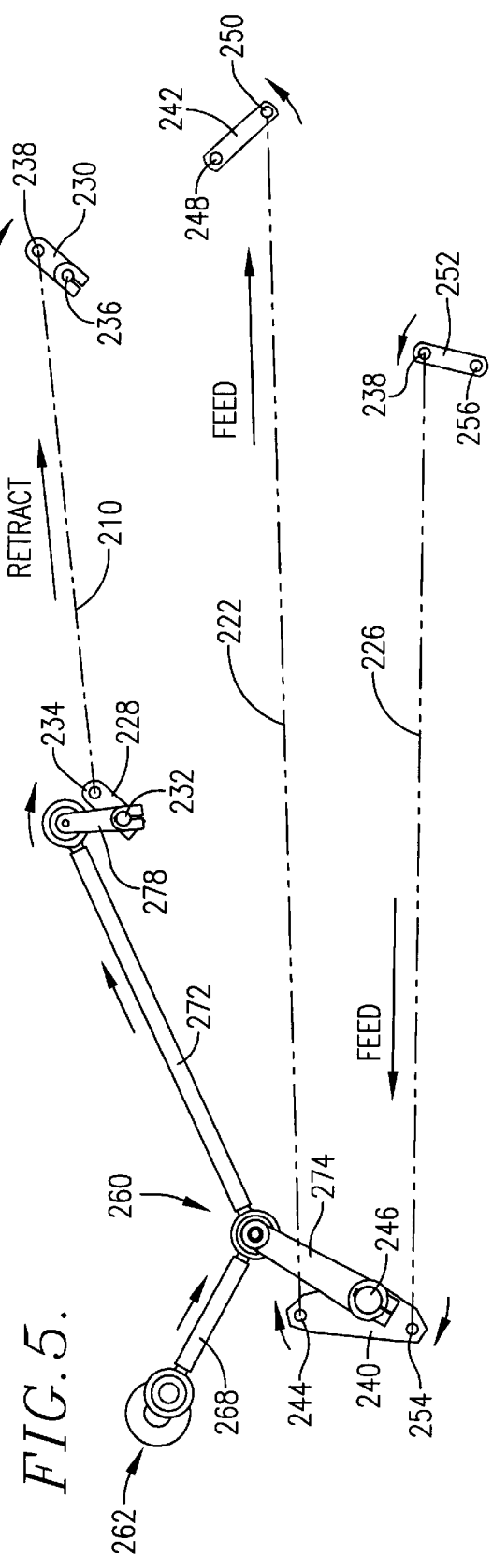

COMBINE HARVESTER CLEANING APPARATUS

TECHNICAL FIELD

The present invention relates to combine harvesters and, more particularly, to improvements in the cleaning apparatus of such machines that sifts the threshed crop materials to provide clean grain, free of chaff and other residue.

BACKGROUND AND SUMMARY

A combine harvester is provided with many systems, any of which can limit productivity, i.e., gathering, feeding, threshing, separating, cleaning, propulsion, engine power or numerous conveying mechanisms throughout the combine in reaction to the crop or field terrain conditions. Within the cleaning system, oscillating sieve assemblies in conjunction with air flow remove chaff and other residue from the threshed grain, which gravitates through the bottom sieve assembly to an oscillating clean grain pan. The clean grain pan, in turn, directs the clean grain to a discharge auger that elevates the grain to an onboard storage bin. A second oscillating pan directs materials other than grain over the edge of the bottom sieve assembly to a different discharge outlet for recirculation back through the threshing, separating and cleaning apparatus to extract the previously unthreshed grain.

It is known in the prior art to sufficiently incline the pans such that gravity pulls the material down the pans at a high enough rate of flow to not be a limiting factor. However, it is also desirable to minimize the downward pan angles in order to reduce overall combine height. Thus, these two objectives are in tension with one another. Fortunately, by continuously oscillating the pans, a lower pan angle can be used because the dynamic friction is more easily overcome by gravity than the larger static friction. Notwithstanding the assistance provided by oscillation, however, prior art machines have sometimes experienced situations in which conveyance stops altogether at lower pan angles, resulting in complete failure of the cleaning system. The problem is particularly prevalent in hill climbing as the inclined pans become more level.

The present invention provides a cleaning apparatus for combine harvesters that can improve the throughput of the machine. It involves in part the recognition that in prior art machines, part of the problem is that the feed stroke of the oscillating pans is opposite to their direction of conveyance. As the pan angle decreases in these machines, a critical point is reached at which conveyance stops altogether. For purposes of this discussion and the detailed description and claims which follow, "feed stroke" refers to that stroke during each cycle of oscillation in which the pan or sieve experiences an upward component of travel, while "retract stroke" refers to the stroke in which the pan or sieve experiences a downward component of travel.

In a preferred form of the invention the cleaning apparatus includes as primary components an oscillating sieve assembly, comprising a pair of superimposed sieves, and a counter oscillating pan assembly below the sieve assembly. The pan assembly comprises a clean grain pan stacked above a lower tailings return pan. The sieve assembly is coupled to its operating mechanism in such a manner that both sieves, moving in unison on a common frame, have their feed stroke in the same direction as their direction of conveyance. This assures that residue particles too large to pass through the sieves are urged in the direction of conveyance by an effective upward "tossing" action as the sieves shift toward their discharge points.

The pan assembly is totally separate from the sieve assembly and is thus moveable in a distinctly separate motion in the most advantageous way, i.e., the feed stroke of the pan assembly is in the same direction as its direction of conveyance. Instead of having one of the sieves mounted on a common frame with the clean grain pan and the tailings return pan as in the prior art, the present invention contemplates having the grain pans mounted on their own frame completely separate from the sieves. Thus, the sieves can be moved in a direction that is most advantageous for the sieves, while the pans can be moved in directions that are most advantageous for them. Furthermore, the clean grain pan, and optionally the tailings pan, is provided with a corrugated top surface of generally sawtooth construction, with the corrugations being inclined generally in the direction of conveyance so as to maximize feeding efficiency.

BRIEF DESCRIPTION OF THE DRAWINGS

FIG. 4 is an illustration of the drive mechanism associated with the cleaning apparatus of FIG. 3 and illustrating various components of the drive in a retracted condition just prior to making a feed stroke;

FIG. 5 is a similar schematic illustration of the drive mechanism of the FIG. 3 cleaning apparatus illustrating the components at the completion of a feed stroke during which materials have been conveyed in appropriate conveying directions.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
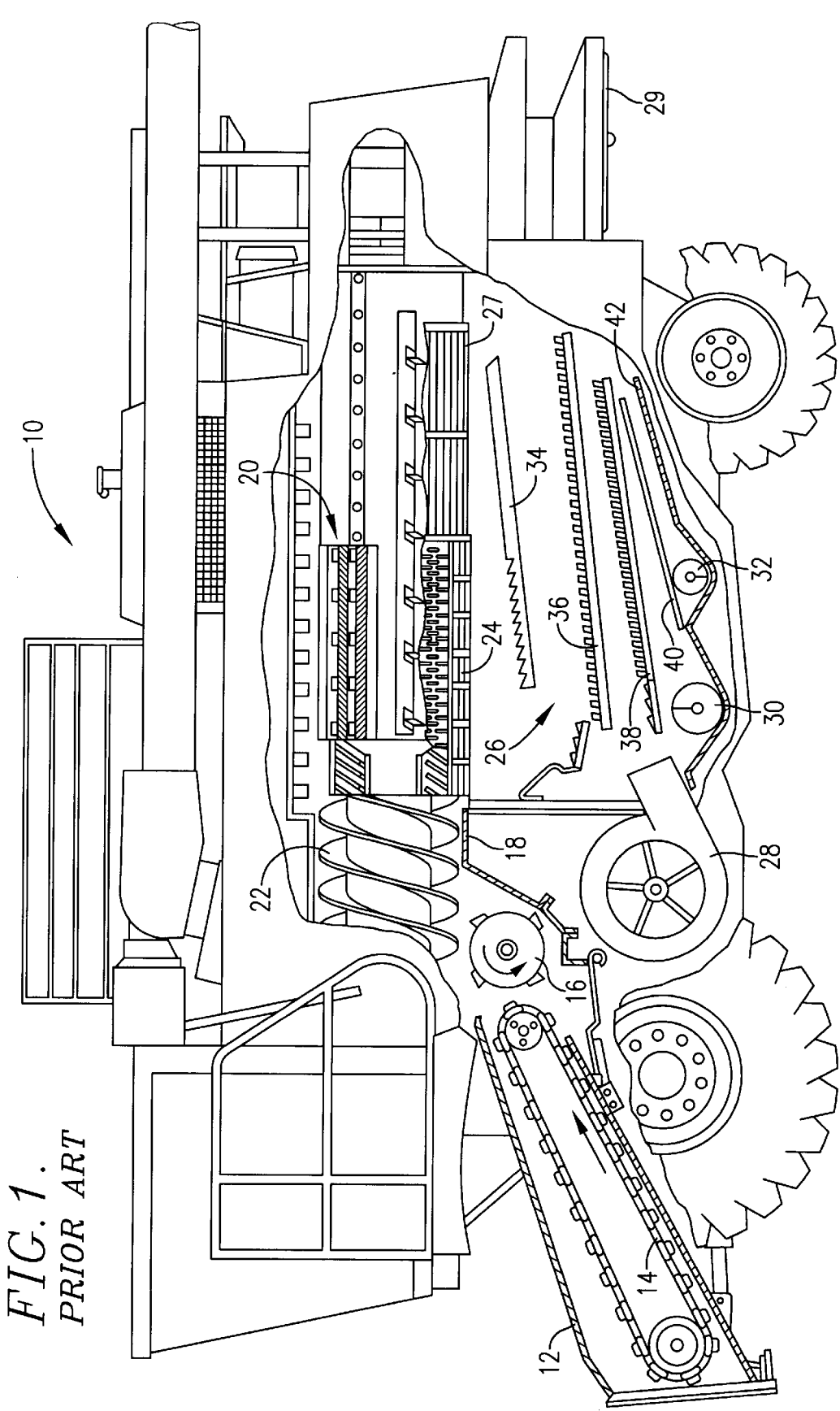
FIG. 1 is a schematic side elevational view of one form of prior art combine harvester with parts broken away to reveal internal details of the feeding, threshing, separating and cleaning portions of the machine.

FIG. 1 schematically illustrates one type of conventional prior art combine harvester 10 to which the present invention relates. Although harvester 10 chosen for purposes of illustration is a so-called axial rotary combine in which the threshing and separating mechanism comprises a rotor disposed axially of the machine with respect to its fore-and-aft axis, many other types of threshing and separating mechanisms are currently in commercial use and it is not intended that the principles of the present invention be limited to any one particular type of threshing and separating mechanism.

In relevant part, harvester 10 has a feed housing 12 that receives harvested materials from a suitable header (not shown) and advances such materials upwardly and rearwardly via a conveyor 14 toward a beater 16 rotating in a counterclockwise direction viewing FIG. 1. Beater 16 impels the harvested materials upwardly and rearwardly into a receiving housing 18. Housing 18 contains the front end of a threshing and separating rotor broadly denoted by the numeral 20, such front end having a series of helical vanes 22 that start the materials moving rearwardly in a spiral path of travel along the outside of the rotor. As the materials move rearwardly, concaves 24 cooperate with rotor 20 to thresh the materials, and initial separation occurs as grain and smaller residue are pushed through the grated concaves region by centrifugal force to the cleaning apparatus 26. Large residue pieces such as stalks and stems continue to move rearwardly past a separating grate 27 which allows grain to pass radially out of the rotor area to cleaning apparatus 26, but not the larger residue. Such residue eventually discharges out the rear end of the rotor assembly where it is acted upon by a chopper or spreader 29 and deposited on the ground.

Generally speaking, the threshed grain works its way downwardly through the machine as it is acted upon cleaning apparatus 26. During this process, light chaff particles become airborne by a rearwardly directed airstream generated by a fan 28 of cleaning apparatus 26 and are discharged out the rear of the machine. Clean grain ultimately finds its way to a discharge auger 30 leading to an elevator that conveys the clean grain up to a storage tank 32 at the top of the machine. Tailings, consisting of some grain along with other particles of residue, find their way to a tailings return auger 32 which then elevates the tailings via means not illustrated for recirculation back through the threshing, separating and cleaning areas to further separate grain from such residue.

Typically, although not universally, a combine harvester such as harvester 10 includes as part of its cleaning apparatus an upper oscillating pan 34 that delivers materials received from concaves 24 and grate 27 generally downwardly and forwardly. Those materials from pan 34 land on an upper oscillating chaffer sieve 36. Chaffer sieve 36 allows grain to pass downwardly through openings in the sieve while larger particles are impelled generally upwardly and rearwardly until being discharged off the rear end of sieve 36 and out the back of the combine to the ground. A finer oscillating grain sieve 38 receives the grain and residue that has passed through upper sieve 36 and performs essentially the same type of classifying function as upper sieve 36. The smaller kernels of grain fall through the sieve and onto an oscillating grain pan 40, which 40 delivers the grain into the clean grain auger 30. The larger tailings particles unable to penetrate lower sieve 38 travel off the rear discharge end of sieve 38 and drop to a tailings return pan 42 that feeds such materials to the tailings return auger 32. As the kernels of grain gravitate through sieves 36 and 38, the airstream from fan 28 entrains the light non-grain particles and carries them out the rear of the machine.

Figure 2:
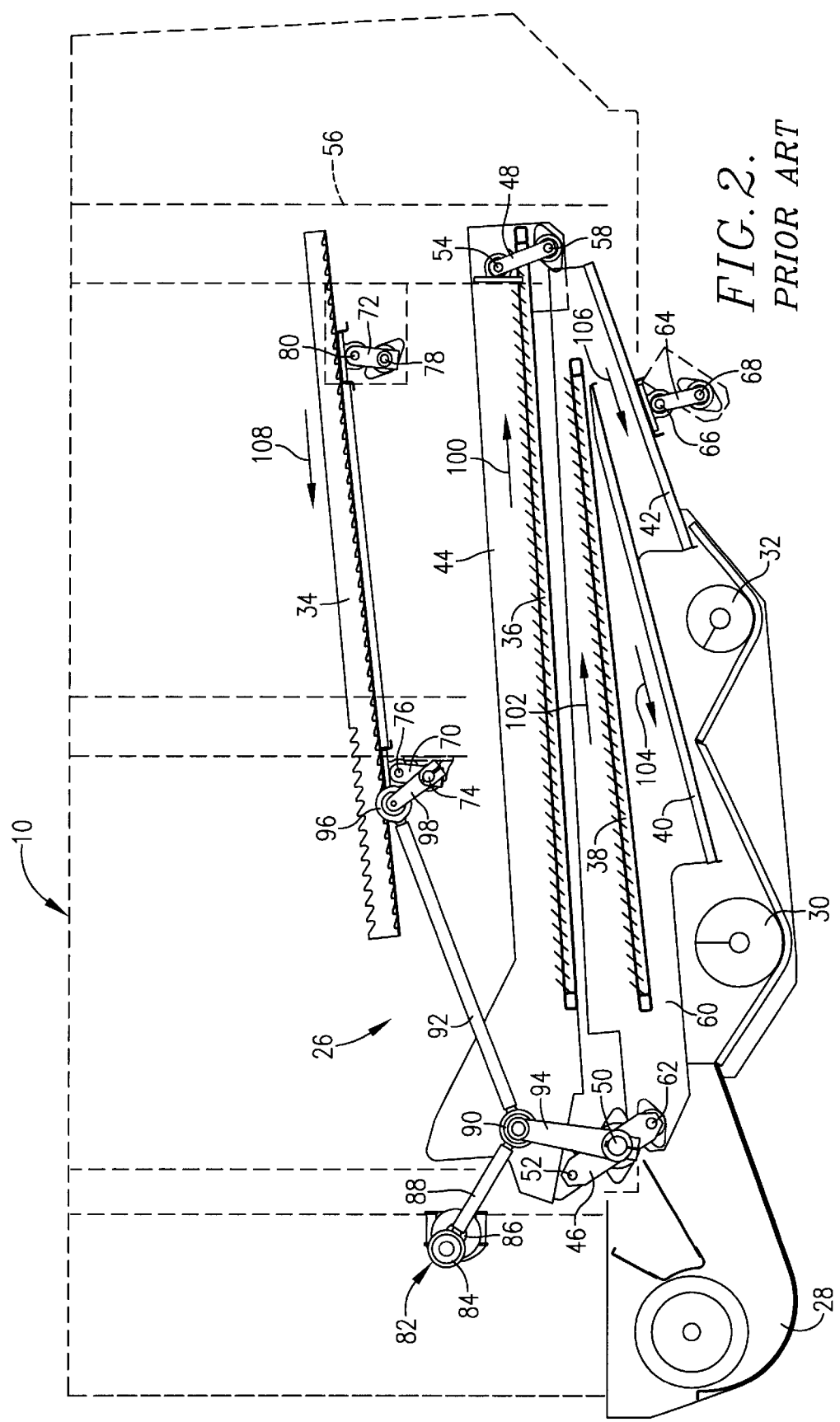
FIG. 2 is a somewhat enlarged, fragmentary illustration of the cleaning apparatus of the prior art harvester of FIG. 1.

FIG. 2 is a somewhat enlarged, schematic, fragmentary view of the prior art harvester 10 of FIG. 1, showing in more detail the construction of cleaning apparatus 26. In the prior art cleaning apparatus 26, upper sieve 36 is supported on a frame 44 that is in turn supported at its front by a lever 46 and at its rear by a link 48. Front lever 46 is fixed adjacent its middle to a transverse, oscillating jackshaft 50 and has a pivot connection 52 at its upper end with the lower front end of frame 44. Rear link 48 has a pivotal mounting 54 at its upper end to stationary frame structure 56 of the harvester and has a pivot connection 58 at its lower end with frame 44 so as to effectively suspend the rear end of frame 44 from support structure 56.

Lower sieve 38 is not mounted on frame 44. Instead, it shares a common frame 60 with clean grain pan 40 and tailings return pan 42. At its front end, frame 60 is suspended from oscillating shaft 50 by the lower end of lever 46, via a pivot connection 62. At its rear end, frame 60 is supported by a link 64 that has a pivotal connection 66 with frame 60 and a pivotal mounting 68 with the structural frame of the harvester.

Upper pan 34 is supported for oscillation by a pair of front and rear links 70 and 72. Front link 70 is fixed at its lower end to a transverse rockshaft 74 rotatably supported by frame structure of the harvester, and has a pivot connection 76 at its upper end with sieve 34. Rear link 72 has at its lower end a pivotal mounting 78 with the frame structure of the harvester, and has a pivot connection 80 at its upper end with sieve 34.

Driving power for oscillating the sieves and pans of cleaning apparatus 26 in the prior art machine is provided by an eccentric input drive unit 82. Unit 82 has an eccentrically disposed coupling 84 that constantly orbits about a transverse axis that is obscured in FIG. 2 but is generally denoted by the numeral 86. A pitman arm 88 leading from coupling 84 thus generally moves in a reciprocating, fore-and-aft motion as eccentric coupling 84 rotates about axis 86. At its rear end, pitman 88 has a pivotal junction 90 which distributes reciprocating motion to upper pan 34, frame 44 and frame 66 via a pair of arms 92 and 94. The upper arm 92 has a pivotal coupling 94 at its rear end with a crank 98 that is fixed to rockshaft 74 for oscillating rockshaft 74. On the other hand, arm 94 is fixed at its lower end to jackshaft 50 so as to cause oscillating rotation of that particular shaft.

In the prior art cleaning apparatus 26 the conveying direction for upper sieve 36 is upwardly and rearwardly as indicated by the arrow designated by the numeral 100. Similarly, the direction of conveyance of lower sieve 38 is also upwardly and rearwardly as denoted by the arrow 102. On the other hand, the direction of conveyance of clean grain pan 40 is downwardly and forwardly as indicated by arrow 104, while the direction of conveyance of tailings return pan 42 is also downwardly and forwardly as indicated by the arrow 106. The direction of conveyance of upper pan 34 is downwardly and forwardly as indicated by arrow 108.

Although the directions of intended conveyance of the two sieves 36 and 38 in the prior art cleaning apparatus 26 are both upwardly and rearwardly, the two sieves oscillate 180° out of phase with one another such that they are always moving in mutually opposite directions. Thus, as upper sieve 36 is moving through a feed stroke to move materials in the conveying direction 100, lower sieve 38 is moving through a retract stroke during which materials are not thrown in the conveying direction 102. In FIG. 2 upper sieve 36 has just completed its retract stroke and is about to begin its feed stroke, during which sieve 36 will move upwardly and rearwardly. This is due to the fact that as jackshaft 50 is rocked clockwise by arm 94, the upper end of lever 46 at the front end of sieve 36 moves upwardly and rearwardly as does link 48 at the rear end of sieve 36. This upward component of travel coupled with the rearward motion has the effect of impelling materials upwardly and rearwardly in the conveying direction 100 for sieve 36.

Such clockwise stroke of jackshaft 50 simultaneously drives lower sieve 38 downwardly and forwardly as the lower end of lever 46 is rotated downwardly and forwardly by jackshaft 50. Rear link 64 moves downwardly and forwardly at this time with lower sieve 38.

After jackshaft 50 has completed its clockwise stroke, it is rotated back in a counterclockwise stroke by arm 94 as pivotal coupling 84 completes its 360° cycle of rotation and returns to its approximately ten o'clock position illustrated in FIG. 2. During such counterclockwise stroke of jackshaft 50, upper sieve 36 moves downwardly and forwardly in a retract stroke, while lower sieve 38 moves upwardly and rearwardly in a feed stroke. It is during its feed stroke that lower sieve 38 is operable to move materials in its intended conveying direction 102.

It will be seen, however, that while the upward component of movement helps lower sieve 38 move materials in its direction of conveyance 102, it actually works against the ability of clean grain pan 40 to advance grain in the grain conveying direction 104 at this time. Tailings return pan 42 also experiences the same problem. This is due to the fact that while lower sieve 38 is undergoing an upward component of travel during its feed stroke, lower clean grain pan 40 and tailings return pan 42 are likewise moving upwardly and rearwardly through a feed stroke, opposite to their downward and forward directions of conveyance 104 and 106. Consequently, at shallow pan angles, gravity is no longer able to overcome the negative effects of the backward feed stroke, and conveyance stops. This results in total shut down of the cleaning system function.

Figure 3:
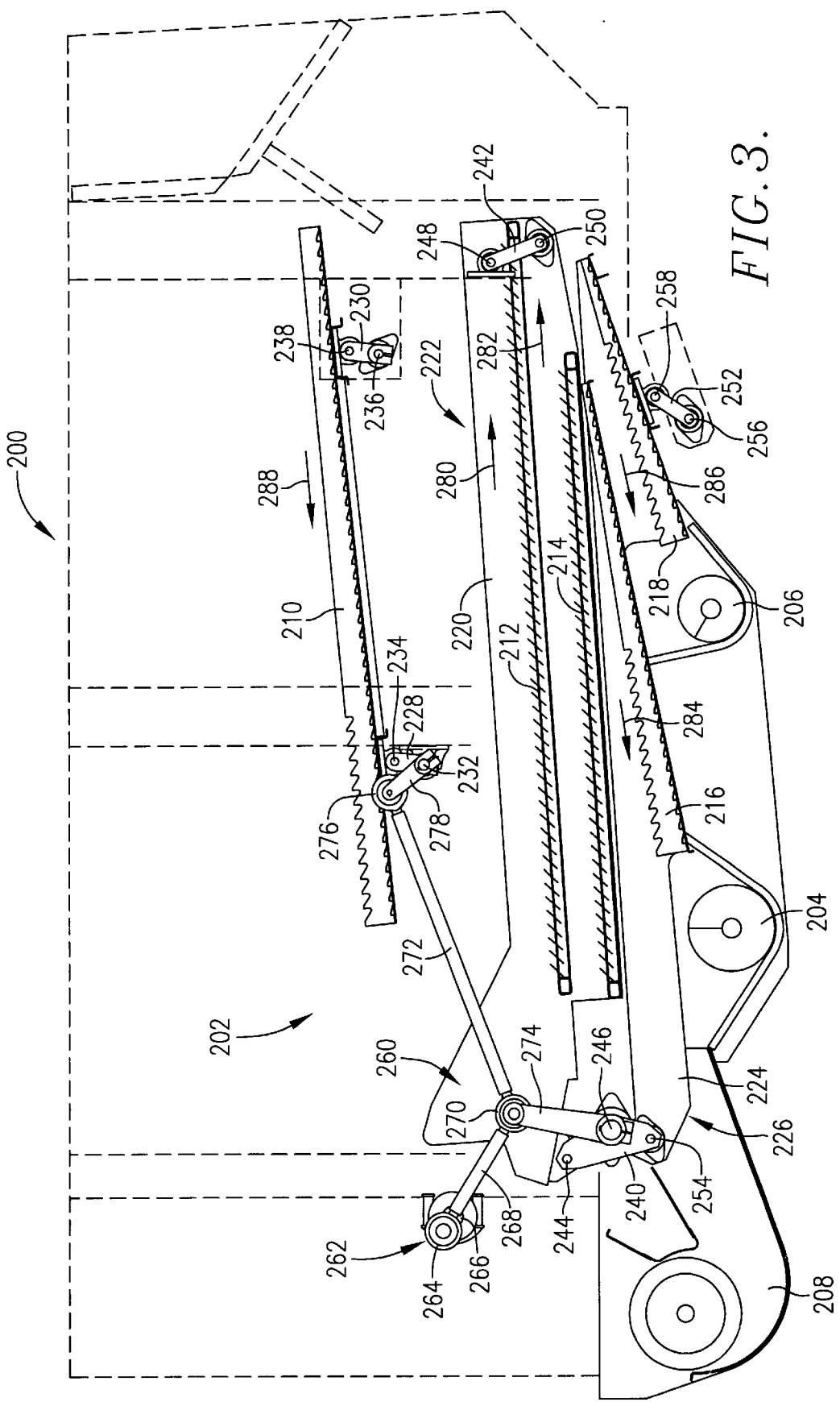
FIG. 3 is a somewhat schematic illustration of a cleaning apparatus constructed in accordance with the principles of the present invention.

FIG. 3 illustrates a combine harvester 200 incorporating a cleaning apparatus 202 constructed in accordance with the principles of the present invention. Cleaning apparatus 202 is operable to deliver clean grain to a clean grain elevating auger 204 and tailings to a tailings return auger 206. A fan 208 of the cleaning apparatus 202 functions to blow air through the rest of the apparatus so as to entrain light residue particles and carry them out the rear of the machine, in substantially the same manner as described above with respect to prior art harvester 10.

Figure 6:
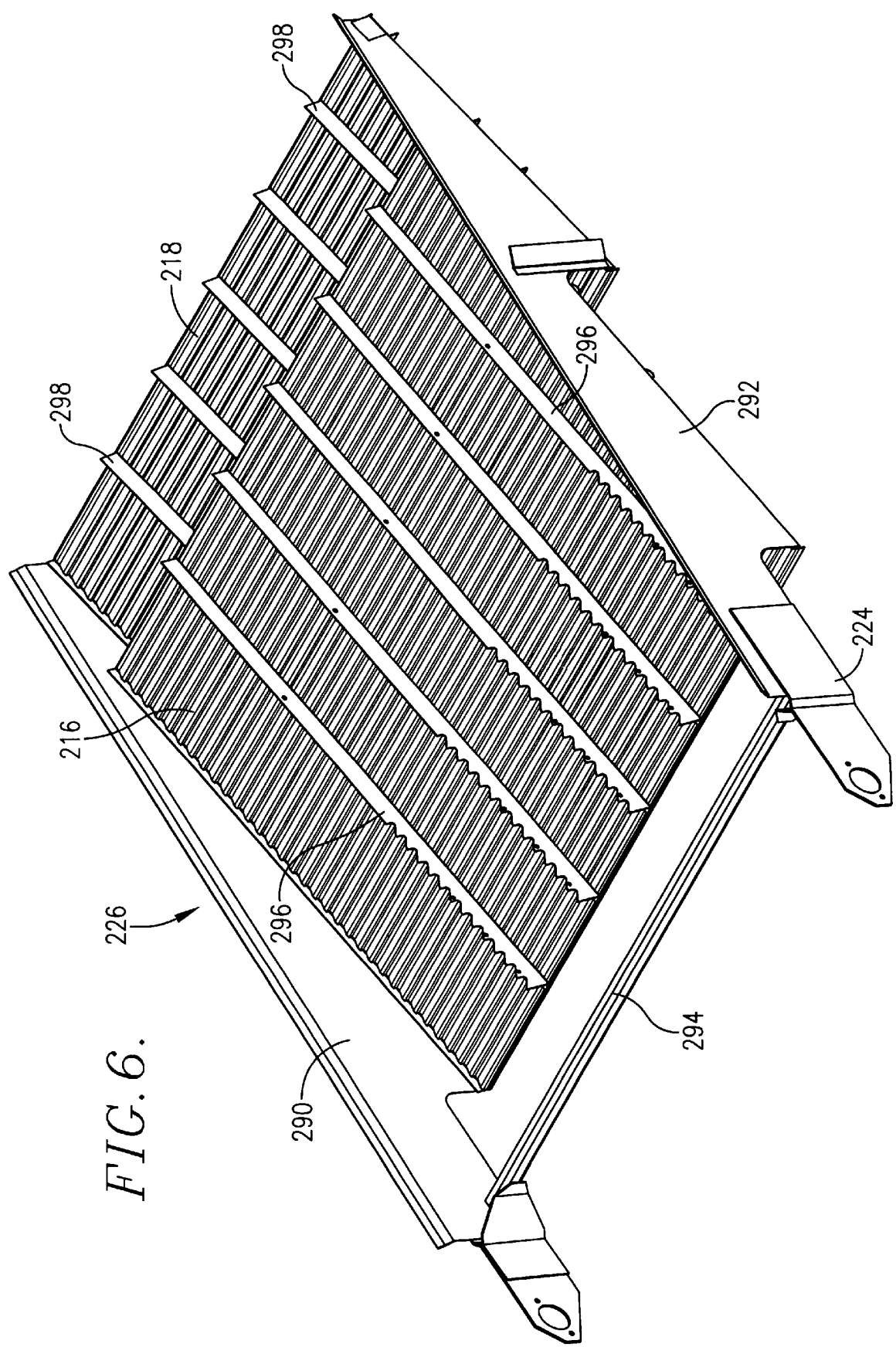
FIG. 6 is an isometric view the pan assembly of the cleaning apparatus showing the upper clean grain pan and the lower tailings return pan of the assembly, with the optional corrugations.

Like the prior art apparatus, cleaning apparatus 202 includes an upper pan 210, an upper sieve 212, a lower sieve 214, a clean grain pan 216, and a tailings return pan 218. However, unlike prior art apparatus 26, in apparatus 202 the sieves 212 and 214 are mounted on a common frame 220 to present a sieve assembly 222, while pans 216 and 218 are mounted on a separate frame 224 to present a pan assembly 226. Pan assembly 226 is also shown in FIG. 6 and will hereinafter be referred to in more detail with respect to certain details of construction of the pans 216 and 218. Thus, it will be seen that in the present invention, the lower pans are no longer on the same frame as the lower sieve of the cleaning apparatus and that the lower sieve shares a common support frame with the upper sieve. Sieves 212 and 214 may be constructed in a variety of different ways as well understood by those of skill in the art, including the use of adjustable louvers or the like for regulating the sizes of the apertures or orifices associated with the sieves.

Upper pan 210 is supported at its forward end by a link 228 and at its rearward end by a link 230. Front link 228 is fixed at its lower end to a rockshaft 232 and is pivotally coupled at its upper end to pan 210 by a pivot connection 234. Rear link 230 at its lower end has a pivotal mounting 236 to the frame of the harvester, while being provided at its upper end with a pivot connection 238 with pan 210.

Frame 220 of sieve assembly 222 is supported at its front end by a lever 240 and at its rear end by a link 242. Lever 240 at its upper end has a pivot connection 244 with the front of frame 220 and, adjacent its midpoint, is fixedly joined to a transverse, oscillatory jackshaft 246. Rear link 242 at its upper end has a pivotal mounting 248 with frame structure of the harvester, and at its lower end has a pivot connection 250 with the rear end of frame 220. Link 242 thus hangs or suspends the rear end of frame 220 from the supporting frame structure of the harvester.

Frame 224 of pan assembly 226 is supported at its front end by the lower end of lever 240 and at its rear end by a link 252. As will be seen, lever 240, while being fixed to transverse jackshaft 246, extends in opposite upper and lower directions beyond shaft 246 such that the upper end of lever 240 can be used to support sieve frame 220 while the lower end of lever 220 can be used to support pan frame 224. Such lower end of lever 240 has a pivot connection 254 with the front end of frame 224, it being noted that an imaginary line of centers interconnecting pivot connections 244 and 254 is disposed forwardly offset from the axis of oscillation of jackshaft 246. Rear link 252 at its lower end has a pivotal mounting 256 with frame structure of the harvester while having at its upper end a pivot connection 258 with the rear of pan frame 224.

Drive mechanism broadly denoted by the numeral 260 for oscillating the pans and sieves of apparatus 202 includes an eccentric input drive unit 262 corresponding to unit 82 in the prior art machine. An eccentrically disposed coupling 264 of unit 262 orbits about axis 266 and is joined to a pitman 268. At its rear end pitman 268 has a pivotal junction 270 with arms 272 and 274 that comprise further portions of the drive mechanism 260. Arm 272 at its rear end has a pivotal coupling 276 with the upper end of a crank 278 that is fixed to rockshaft 232. Arm 274 is fixed at its lower end to jackshaft 246 so as to provide oscillating motion thereto.

The intended direction of conveyance for upper sieve 212 is upwardly and rearwardly as indicated by arrow 280. Likewise, the intended direction of conveyance for lower sieve 214 is upperwardly and rearwardly as indicated by arrow 282. The intended direction of conveyance of clean grain pan 216 is downwardly and forwardly toward auger 204 as indicated by arrow 284, and the intended direction of conveyance of tailings return pan 218 is downwardly and forwardly toward auger 206 as indicated by the arrow 286. The direction of conveyance of the upper pan 210 is generally downwardly and forwardly as indicated by arrow 288.

In the cleaning apparatus 202, the feed strokes of pans 210, 216, 218 and sieves 212, 214 are always in the same direction as their directions of conveyance, thus maximizing their abilities to feed and deliver materials. These relationships are shown, for example, illustratively in FIGS. 4 and 5. FIG. 4 corresponds to the condition of things in FIG. 3 wherein upper pan 210 has just completed its feed stroke, and sieve assembly 222 and pan assembly 226 have just completed retract strokes.

It will be noted that, in this condition, links 228 and 230 of upper pan 210 are approximately at twelve o'clock positions. The upper end of lever 240 supporting sieve assembly 222 is in the eleven o'clock position, while link 242 supporting the rear of sieve assembly 222 is in a five o'clock position. The lower end of lever 240 supporting the front end of pan assembly 226 is slightly to the seven o'clock side of a six o'clock position, while link 252 supporting the rear of pan assembly 226 is in the two o'clock position.

As the eccentric drive unit 262 then rotates 180° from the FIG. 4 condition to the FIG. 5 condition, crank 278 for upper pan 210 is rotated clockwise by arm 272 to swing front link 228 and rear link 230 downwardly and rearwardly to the two o'clock position. Thus, pan 210 is moving through its retract stroke at this time in a direction opposite to its direction of conveyance 288.

Likewise, the upper end of lever 240 is rotated upwardly and rearwardly in a clockwise direction by arm 274 and jackshaft 246 almost to the twelve o'clock position while the rear link 242 swings upwardly and rearwardly to the four o'clock position. Thus, sieve assembly 222 experiences an upward component of travel and moves through its feed stroke in the same direction as the directions of conveyance 280 and 282 of sieves 212 and 214.

Simultaneously, the lower end of lever 240 is swinging upwardly and forwardly from the six o'clock position of FIG. 4 to the seven o'clock position of FIG. 5, and the rear link 252 is moving upwardly and forwardly from the two o'clock position of FIG. 4 to the one o'clock position of FIG. 5. Consequently, pan assembly 226 experiences an upward component of travel and moves through its feed stroke in the same direction as the directions of conveyance 284 and 286 of pans 216 and 218. This maximizes the feeding action of pans 216 and 218 and, to at least some extent, counterbalances the oscillating action of sieve assembly 222 which is almost 180° out of phase with pan assembly 226.

FIG. 6 shows the pan assembly 226 in a more isolated condition to reveal details of construction. It will be seen that the common frame 224 for pans 216 and 218 includes a pair of laterally spaced sidewalls 290 and 292 that are interconnected by the respective pans 216 and 218. A transverse bar 294 also spans the sidewalls 290, 292 across the front ends thereof above the level of the clean grain pan 216. The upper surface of clean grain pan 216 is corrugated to provide a saw tooth-like effect, with each corrugation leaning forwardly in the intended direction of conveyance so as to encourage forward displacement of the grain without retrograde movement thereof A plurality of fore-and-aft extending, laterally spaced apart dividers 296 are provided on clean grain pan 216, the forward ends thereof being corrugated in the same manner as the top surface of pan 216. Tailings pan 218 may also be similarly corrugated and provided with a multiplicity of fore-and-aft extending dividers 298 as shown, although this feature may be omitted if desired.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In a combine harvester, the improvement comprising:
   separating apparatus in an upper portion of the harvester; and
   cleaning apparatus below the separating apparatus in position for receiving grain to be cleaned from the separating apparatus,
   said cleaning apparatus including
      a fan operable to direct a current of air through the harvester to lift and convey light residue particles away from the grain toward a discharge outlet while the grain progresses downwardly toward a collection point in a lower portion of the harvester,
      an oscillatable sieve assembly having a direction of conveyance that is generally the same as the direction of movement of the current of air for directing residue particles toward the outlet while grain gravitates through apertures in the sieve assembly,
      a separate oscillatable pan assembly below said sieve assembly in position for receiving grain gravitating through apertures in the sieve assembly and having a direction of conveyance that is generally opposite to the direction of movement of the current of air for directing grain toward said collection point, and
      drive mechanism operably coupled with said sieve assembly and the pan assembly respectively for oscillating the same through feed strokes and retract strokes,
      said mechanism being coupled with said sieve assembly and the pan assembly in such a manner that the feed stroke of each assembly is in the same direction as its direction of conveyance whereby the feed stroke of the sieve assembly is generally in the same direction as the current of air and the feed stroke of the pan assembly is generally in the opposite direction of the current of air.

2. In a combine harvester as claimed in claim 1,
   said pan assembly including a clean grain pan having a feeding surface provided with transverse corrugations of generally saw-tooth, cross-sectional configuration,
   said corrugations being inclined forwardly in the direction of conveyance of the clean grain pan.

3. In a combine harvester as claimed in claim 2,
   said pan assembly further including a tailings return pan having a feeding surface provided with transverse corrugations of generally saw-tooth, cross-sectional configuration,
   said corrugations of the tailings return pan being inclined forwardly in the direction of conveyance of the tailings return pan.

4. In a combine harvester as claimed in claim 1,
   said sieve assembly comprising a pair of superimposed, vertically spaced sieves fixed to a common support frame such that the sieves move in unison during oscillation of the sieve assembly.

5. In a combine harvester as claimed in claim 4,
   said sieve assembly and said pan assembly being disposed to oscillate approximately 180° out of phase with one another.

6. In a combine harvester as claimed in claim 1,
   said sieve assembly and said pan assembly being disposed to oscillate approximately 180° out of phase with one another.

7. In a combine harvester as claimed in claim 6,
   said drive mechanism including an oscillating drive shaft and a lever fixed to said shaft for oscillation therewith,
   said lever having a pair of opposite ends and being fixed to said drive shaft intermediate said opposite ends,
   one end of said lever being operably coupled with said sieve assembly and the other end of said lever being operably coupled with said pan assembly,
   said ends of the lever each being disposed to swing upwardly during the feed stroke of the assembly to which it is coupled.

8. In a combine harvester as claimed in claim 1,
   said drive mechanism including an oscillating drive shaft and a lever fixed to said shaft for oscillation therewith,
   said lever having a pair of opposite ends and being fixed to said drive shaft intermediate said opposite ends,
   one end of said lever being operably coupled with said sieve assembly and the other end of said lever being operably coupled with said pan assembly,
   said ends of the lever each being disposed to swing upwardly during the feed stroke of the assembly to which it is coupled.

9. In a combine harvester as claimed in claim 4, further including an oscillatable upper separator pan above said sieve assembly and having a direction of conveyance, said drive mechanism being operably coupled with said upper separator pan for oscillating the same through through feed strokes and retract strokes, said mechanism being coupled with the upper separator pan in such a manner that the feed stroke of the upper separator pan is in the same direction as said direction of conveyance.

\* \* \* \* \*